(12) United States Patent
Zaleski et al.

(10) Patent No.: US 6,287,694 B1
(45) Date of Patent: Sep. 11, 2001

(54) METHOD FOR EXPANDING LAMELLAR FORMS OF GRAPHITE AND RESULTANT PRODUCT

(75) Inventors: Peter L. Zaleski, Willow Springs; David J. Derwin, Des Plaines; Richard J. Girkant, Lansing, all of IL (US)

(73) Assignee: Superior Graphite Co., Chicago, IL (US)

( * ) Notice: Subject to any disclaimer, the term of this patent is extended or adjusted under 35 U.S.C. 154(b) by 0 days.

(21) Appl. No.: 09/253,957

(22) Filed: Feb. 22, 1999

Related U.S. Application Data

(60) Provisional application No. 60/077,894, filed on Mar. 13, 1998.

(51) Int. Cl.$^7$ ................................. B32B 5/16; C01B 31/04
(52) U.S. Cl. ............................................ 428/402; 423/448
(58) Field of Search ............................. 428/402; 423/448

(56) References Cited

U.S. PATENT DOCUMENTS

| | | | |
|---|---|---|---|
| 3,389,964 | * 6/1968 | Olstowski | 423/448 |
| 3,404,061 | * 10/1968 | Shane et al. | 428/143 |
| 3,719,608 | * 3/1973 | Olstowski | 252/506 |
| 4,244,934 | * 1/1981 | Kondo et al. | 423/448 |
| 4,265,952 | * 5/1981 | Caines | 428/36 |
| 4,350,576 | 9/1982 | Watanabe et al. | 204/101 |
| 4,396,253 | 8/1983 | Kuwagaki et al. | 350/357 |
| 4,485,155 | 11/1984 | Holl et al. | 429/194 |
| 4,895,713 | * 1/1990 | Greinke et al. | 423/448 |
| 4,915,925 | * 4/1990 | Chung | 423/447.1 |
| 5,186,919 | * 2/1993 | Bunnell | 423/448 |
| 5,294,300 | * 3/1994 | Kusuyama | 162/157.3 |
| 5,330,680 | * 7/1994 | Sakawaki et al. | 252/309 |
| 5,482,798 | 1/1996 | Mototani et al. | 429/224 |
| 5,516,339 | 5/1996 | Bailey | 29/623.1 |
| 5,518,189 | * 5/1996 | Grondin et al. | 241/20 |
| 5,582,781 | 12/1996 | Hayward | 264/28 |
| 5,587,257 | 12/1996 | Tibbetts et al. | 429/218 |
| 5,591,547 | 1/1997 | Yoneda et al. | 429/218 |
| 5,599,643 | 2/1997 | Plichta et al. | 429/220 |
| 5,756,062 | * 5/1998 | Greinke et al. | 423/449.4 |
| 5,981,072 | * 11/1999 | Mercuri et al. | 428/408 |

FOREIGN PATENT DOCUMENTS 0 583 062 B1    9/1999    (EP) .

OTHER PUBLICATIONS

Supplementary European Search Report, Application No. EP 99 91 1280, dated May 2, 2000.
M. B. Dowell, "Exfoliation of Intercalated Graphites, Part 1, Effect of Graphite Crystallinity" (XP0000901706).

* cited by examiner

*Primary Examiner*—Hoa T. Le
(74) *Attorney, Agent, or Firm*—Cook, Alex, McFarron, Manzo, Cummings & Mehler, Ltd.

(57) ABSTRACT

A method for making expanded graphite from lamellar flake graphite comprising first providing lamellar flake graphite particles having at least a minimal purity, then intercalating the lamellar flake graphite particles with an expandable graphite intercalation compound, followed by expanding the graphite intercalation compound to exfoliate the flake graphite particles, and finally air milling the exfoliated flake graphite particles to further delaminate them.

20 Claims, 1 Drawing Sheet

METHOD FOR EXPANDING LAMELLAR FORMS OF GRAPHITE AND RESULTANT PRODUCT

CROSS REFERENCE TO RELATED APPLICATION

This application claims the benefit of provisional application Ser. No. 60/077,894, filed Mar. 13, 1998.

This invention relates to a method of producing a form of graphite having certain highly desirable characteristics and, more particularly, to a method resulting in an expanded, highly lamellar graphite product having a particular particle size distribution, a high bulk volume, and a high surface area to mass ratio.

BACKGROUND OF THE INVENTION

Highly lamellar forms of graphite have found wide ranging industrial applicability because of their low thermal and electrical resistivity and their ability to enhance thermal and electrical conductivity when added to a low or non-conductive particulate (material). Specifically, when highly lamellar graphite is mixed with or dispersed in particulate which are non-conductive or partially electrically conductive, the thin platelets of graphite become interlaced between the base particles, thus providing a more conductive path and more uniform contact with the particles than could achieved using the same concentration of non-lamellar graphite.

Exfoliated or expanded lamellar graphite has similar enhanced characteristics and utility. Thermally exfoliated graphite ("TEG") has an accordion-like configuration of separated, stacked lamellae. Like naturally occurring lamellar graphite, delaminated, exfoliated, expanded graphite "worms" are also used for applications such as enhancing thermal or electrical conductivity in various matrices. For example, in the manufacture of alkaline dry cell batteries, delaminated exfoliated flake graphite is used in the positive electrode active material. See, e.g., U.S. Pat. No. 5,482,798 to Mototani et al., which is incorporated herein by reference. If the flake graphite can be expanded in a manner to maximize its surface area for a given mass and be successfully delaminated, greater conductivity can be attained for the positive electrode. This results in an improved discharge performance and longer useful life for the battery. Simultaneously, the amount of graphite needed to produce the electrode can be decreased, resulting in an increase of the active electrode material, $MnO_2$.

Typically, lamellar graphite has been expanded by the intercalation of a compound into or between the interlayers of the crystal structure of the graphite. The graphite intercalation compound ("GIC") is then expanded to dramatically enlarge the spaces between the graphite interlayers. The intercalation of lamellar graphite has been studied in detail and described in numerous technical papers and patents. For example, the Mototani et al. patent identified above describes making an expanded graphite product of artificial graphite by introducing sulfuric acid into the sulfuric graphite interlayers and rapidly heating the graphite at temperatures of between 800° C. and 1,000° C. Similarly, U.S. Pat. No. 4,350,576 to Watanabe et al., which is incorporated by reference herein, describes an intercalation process using an electrolytic intercalation solution in which the graphite is subjected to electrolysis, dried and then heated to 1000° C. to obtain an expanded graphite.

Thus, while it has been known how to expand graphite, as more uses for the material have been discovered, it has become desirable to produce such expanded graphite in commercial quantities in a more efficient and economic manner.

Accordingly, it is the object of the present invention to provide an efficient and economic method for producing expanded graphite.

This object, as well as others which will become apparent upon reference to the following description and accompanying drawing, it met by method for making expanded graphite from lamellar flake graphite comprising first providing lamellar flake graphite particles having at least a minimal purity, then intercalating the lamellar flake graphite particles with an expandable graphite intercalation compound, followed by expanding the graphite intercalation compound to exfoliate the flake graphite particles, and finally air milling the exfoliated flake graphite particles to further delaminate them.

DESCRIPTION OF THE PREFERRED EMBODIMENT

Figure 1:
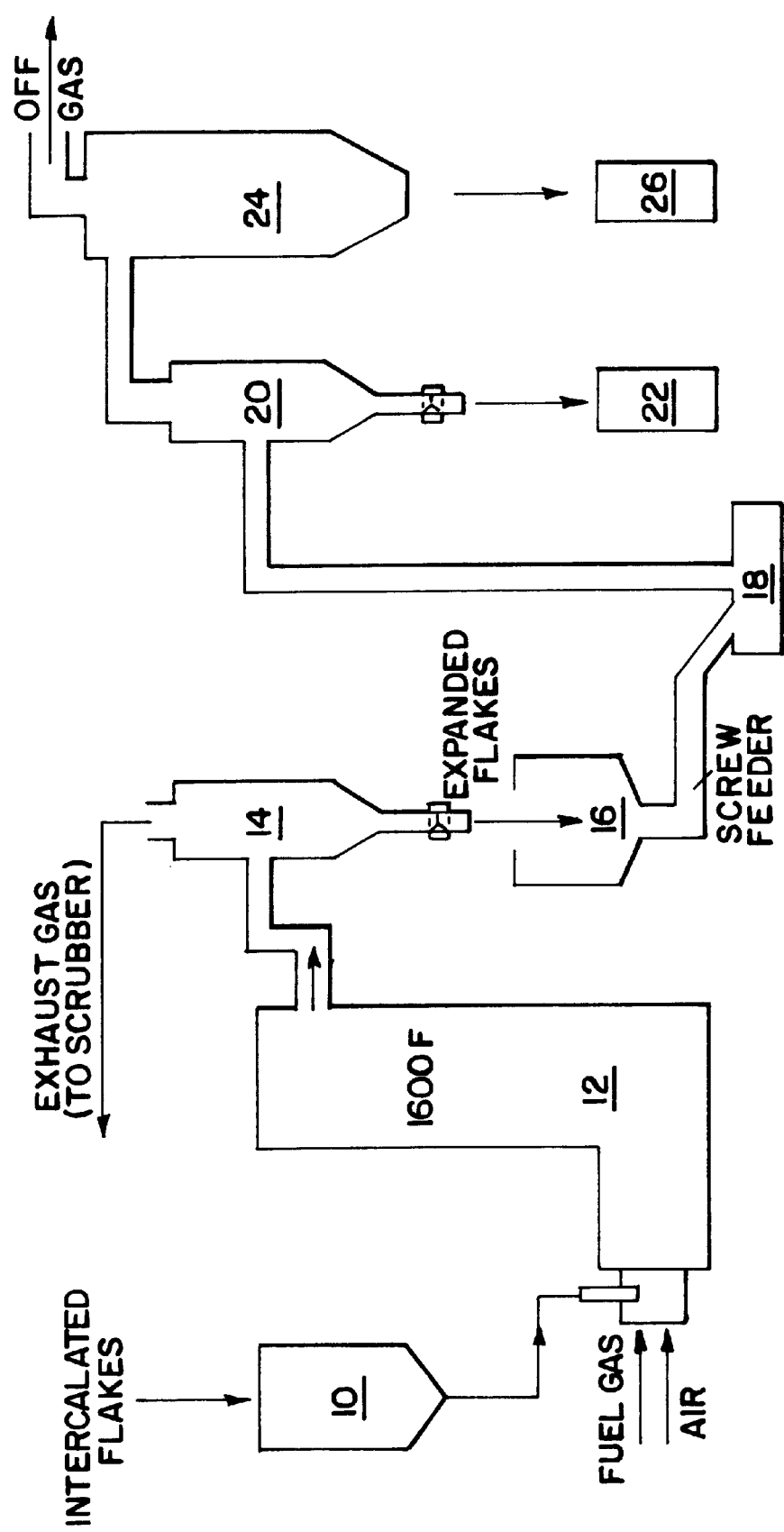
FIG. 1 is a schematic drawing illustrating the expansion and milling steps of the inventive process.

The inventive process requires the provision of a suitable starting material of lamellar graphite; the intercalation of the starting material with a GIC; the expansion of the GIC to obtain TEG; and air milling the TEG to obtain a delaminated, exfoliated graphite product having a high degree of uniformity in particle size, a high bulk volume, and a high surface area to mass ratio.

The starting material is preferably natural mineral flake graphite or synthetic graphite having a degree of three dimensional ordering, i.e., highly oriented pyrolytic graphite ("HOPG"). The degree of three dimensional ordering of the graphite can be quantified by x-ray diffraction ("XRD"). The XRD parameter generally used is referred to as $L_a$ and, based on XRD analysis, the graphite best suited for the inventive process has $L_a$ values in excess of 2.000 Å and preferably higher.

In the preferred method, the starting material is natural flake graphite mined in Mozambique that is processed to a minimum level of purity of 99.9% LOI (loss on ignition), with the particle size of the graphite being between about −20 mesh and +60 mesh and, preferably between 30 mesh and 70 mesh (200–600 microns). Such a natural flake graphite can be obtained from the Superior Graphite Co. of Chicago, Ill., assignee of this application, as 2901 grade graphite. However, it is appreciated that the minimum level of purity of the starting material is dependent upon the ultimate use of the delaminated, exfoliated graphite product that results from the method. The very high minimum purity of 99.9% LOI is appropriate when the graphite is to be used in the active material of alkaline batteries as described above. Lower purity values may be appropriate for other applications.

The purified starting material is then intercalated with a GIC that will insert between the lamellae of the graphite structure. As noted above, there are many different methods by which this can be accomplished. Typically, the graphite particles are treated with a strong oxidizing acid, such as highly concentrated combinations of sulfuric and nitric acid. If sulfuric acid is used as an intercalant acid, the sulfur content of the acid treated graphite should be at least 2.0%, by weight, and preferably as high as 3.0%. The preferred intercalated graphite is Grafoil acid-treated chemical flake graphite from UCAR Carbon Company, of Danbury, Conn., which is natural graphite intercalated with sulfuric acid and nitric acid. The volatile content of the preferred flake graphite after intercalation is preferably between about 12% to 22% by weight.

Next, the intercalated graphite is treated to cause the evolution of the GIC, forcing the lamellae of the individual particles to separate and, thus, expand the graphite to an accordion-like configuration. If the graphite is acid intercalated, the expansion is accomplished by rapidly heating the intercalated graphite to temperatures of about 850° C. to 1,000° C. Such heating may be done any number of ways, such as by directly heating the intercalated graphite with a flame, by placing the intercalated graphite in on a hot surface, by using infra-red heating elements, by inductive heating, or the like. The intercalated graphite is thermally expanded to produce a product that is typically expanded to greater than 125 times is initial volume, with a bulk volume of approximately 250 ml/g or more and with a surface area to mass ratio of 35 $m^2/g$ or greater.

After the graphite has been suitably intercalated and exfoliated, the graphite is subjected to air milling, which further delaminates and separates the expanded graphite. This yields a fine graphite that exhibits a substantially higher specific surface area than the same material milled to the same particle size, but not intercalated and expanded. The expanded graphite is milled in a fluid energy-type attrition mill, or air mill. In the preferred process, a flat-configured or "pancake-type" air mill is used to produce a product with a mean particle size of approximately 30 microns and a surface area of greater than 20 $m^2/g$.

Turning to FIG. 1, there is seen a schematic illustration that diagrams the expansion or exfoliation and milling steps of the present invention. The intercalated graphite flakes (preferably the Grafoil flake graphite identified above) is dumped into a flake feeder 10, from which the graphite flake is fed continuously into the flame of a gas-fired calciner/furnace 12 to cause the intercalated flake to be heated to temperatures of at least approximately 600° C. (1100° F.) in less than one minute and, preferably, at least approximately 870° C. (1600° F.) in less than one minute. In practice, the intercalated graphite flakes are fed into the calciner 12 at rate of approximately 150 lb/hr.

In the calciner 12, the intercalated graphite flake is preferably expanded to form TEG flakes or worms having a bulk volume of at least 200 ml/g and, preferably, at least 250 ml/g and a surface area to mass ratio of approximately 35 $m^2/g$. The TEG worms exit the calciner 12 and enter a cyclone 14 which separates the TEG flake from the entraining burner gases. The TEG flakes drop out of the bottom of cyclone 14 into a second flake feeder 16, while the exhaust gases from the calciner 12 exit the top of the cyclone 14 to a scrubber (not shown).

From the flake feeder 16, TEG flakes are fed to an air mill 18. The air mill 18 includes a positive feed induction system, a grinding and classifying ("reduction") chamber, and a single discharge. The TEG flake entering the reduction chamber is entrained by a stream of circulating fluid (air), and jet action breaks up the TEG particles by inter-particle collisions. The centrifugal force shifts the larger, heavier TEG flakes toward the outer periphery of the reduction chamber, causing them to be re-introduced into the jet stream for further grinding. The finer particles migrate towards the outlet of the mill 18.

In practice, the air mill 18 is an Aljet 24 inch flat-configured attrition mill, which processes the TEG flake at a rate of approximately 120 lb/hr to produce a TEG flake having a bulk volume of approximately 20 ml/g (or a bulk density of 0.050 g/cc), a surface area to mass ratio of at least about 18–22 $m^2/g$, and a mean particle size of approximately 30 microns. These characteristics for the air milled TEG flake can be varied by adjusting the rate at which the TEG flake is milled. Over-feeding the mill results in coarser TEG flakes, while under-feeding results in finer TEG flakes.

The air milled TEG flakes pass through a second cyclone 20, which separates out the milled TEG flakes of the desired mass and deposits them into a finished product bin 72. The finished product can be vacuum-packed, which compacts the material into a smaller, more easily handled package, without adversely affecting the characteristics of the TEG flakes. The undersized TEG flakes or "fines" are exhausted from the cyclone 20 into bag house 24, from which the fines are deposited into a "waste" bin 26.

While the invention has been described in the context of a preferred method, various modifications maybe made without departing from the scope of the invention, as defined by the following claims.

What is claimed is:

1. A method for making expanded graphite from lamellar graphite comprising:
   a) providing lamellar graphite particles having at least a minimal purity;
   b) intercalating the lamellar graphite particles with an expandable graphite intercalation compound;
   c) expanding the graphite intercalation compound to exfoliate the graphite particles; and
   d) air milling the exfoliated graphite particles to further delaminate them.

2. The method of claim 1, wherein the lamellar graphite particles are natural flake graphite purified to 99% LOI; the graphite intercalation compound comprises an acid; and the graphite intercalation compound is expanded by heat.

3. The method of claim 1, wherein the lamellar graphite particles are natural flake graphite thermally purified to 99.9% LOI; the graphite intercalation compound comprises an acid; and the graphite intercalation compound is expanded by heat.

4. The method of claim 2 or 3, wherein the exfoliated flake graphite particles are air milled in a fluid energy attrition mill.

5. The method of claim 4, wherein the fluid energy attrition mill has a flat configuration.

6. The method of claim 2 or 3, wherein the intercalated flake graphite particles are heated to at least approximately 870° C.

7. The method of claim 2 or 3, wherein the intercalated flake graphite particles are heated to at least approximately 600° C.

8. The method of claim 2 or 3, wherein the exfoliated flake graphite particles have a bulk volume of at least about 20 ml/g and a surface area to mass ratio of approximately 35 $m^2/g$.

9. The method of claim 2 or 3, wherein the exfoliated flake graphite particles are air milled to a surface area to mass ratio of at least about 18 $m^2/g$, a mean particle size of approximately 30 microns, and bulk density of approximately 0.050 g/cc.

10. The method of claim 2 or 3, wherein the intercalated flake graphite particles are heated to at least approximately 600° C.

11. The method of claim 2 or 3, wherein the intercalated flake graphite particles are heated to at least approximately 600° C.

12. An exfoliated graphite product having a surface area to mass ratio of at least 18 $m^2/g$, a mean particle size of approximately 30 microns, and a bulk volume of at least 20 ml/g.

13. An exfoliated graphite product having a surface area to mass ratio of at least 18 $m^2/g$ and a bulk volume of at least 20 ml/g.

14. A method for making expanded graphite from lamellar graphite comprising:
   a) providing lamellar graphite particles having at least a minimal purity;
   b) intercalating the lamellar graphite particles with an expandable graphite intercalation compound;
   c) expanding the graphite intercalation compound to exfoliate the graphite particles; and
   d) air milling the exfoliated graphite particles to further delaminate them to create an exfoliated graphite product having a surface area to mass ratio of at least 18 $m^2/g$ and a bulk volume of at least 20 ml/g.

15. The method of claim 14, wherein the lamellar graphite particles are natural flake graphite purified to 99% LOI; the graphite intercalation compound comprises an acid; and the graphite intercalation compound is expanded by heat.

16. The method of claim 14, wherein the lamellar graphite particles are natural flake graphite thermally purified to 99.9% LOI; the graphite intercalation compound comprises an acid; and the graphite intercalation compound is expanded by heat.

17. The method of claim 15 or 16, wherein the exfoliated flake graphite particles are air milled in a fluid energy attrition mill.

18. The method of claim 17, wherein the fluid energy attrition mill has a flat configuration.

19. The method of claim 15 or 16, wherein the intercalated flake graphite particles are heated to at least approximately 870° C.

20. The method of claim 15 or 16, wherein the intercalated flake graphite particles are heated to at least approximately 600° C.

* * * * *

UNITED STATES PATENT AND TRADEMARK OFFICE
CERTIFICATE OF CORRECTION

PATENT NO. : 6,287,694 B1
DATED : September 11, 2001
INVENTOR(S) : Peter L. Zaleski, David J. Derwin and Richard J. Girkant It is certified that error appears in the above-identified patent and that said Letters Patent is hereby corrected as shown below:

Column 4,
Line 47, delete "intercalated";
Line 48, delete "particles are heated to at least approximately 870°C";
Line 48, after "graphite," insert -- after intercalation with the graphite intercalation compound has a volatile content of between about 12% to 22% by weight --;
Line 50, delete "intercalated";
Line 51, delete "are heated to at least approximately 600°C";
Line 51, after "particles," insert -- have a bulk volume of at least about 250ml/g and a surface area to mass ratio of approximately 35m$^2$/g --;
Line 54, after particles, insert -- are air milled to --;
Line 55, delete "35";
Line 55, after "approximately," insert -- 18 --;
Line 64, delete "600°C";
Line 64, after "approximately," insert -- 870°C --;
Line 67, delete "600°C";
Line 67, after "approximately," insert -- 1600°F --;

Column 5,
Line 1, after "An," insert -- air milled --;

Column 6,
Lines 3-7, delete "The method of claim 14, wherein the lamellar graphite particles are natural flake graphite thermally purified to 99.9% LOI; the graphite intercalation compound comprises an acid; and the graphite intercalation compound is expanded by heat";

UNITED STATES PATENT AND TRADEMARK OFFICE
CERTIFICATE OF CORRECTION

PATENT NO. : 6,287,694 B1
DATED : September 11, 2001
INVENTOR(S) : Peter L. Zaleski, David J. Derwin and Richard J. Girkant It is certified that error appears in the above-identified patent and that said Letters Patent is hereby corrected as shown below:

<u>Column 6, cont.</u>
Line 3, insert -- An air milled exfoliated graphite product having a surface area to mass ratio of at least $18m^2/g$ and a bulk volume of at least $20ml/g$. --.

Signed and Sealed this

Twenty-fifth Day of June, 2002

Attest:

JAMES E. ROGAN
*Attesting Officer*                   *Director of the United States Patent and Trademark Office*

UNITED STATES PATENT AND TRADEMARK OFFICE
CERTIFICATE OF CORRECTION

PATENT NO. : 6,287,694 B1
DATED : September 11, 2001
INVENTOR(S) : Peter L. Zaleski et al.

It is certified that error appears in the above-identified patent and that said Letters Patent is hereby corrected as shown below:

Column 4,
Line 55, replace "18" with -- 35 --.
Line 67, replace "1600°F" with -- 600°C --.

Column 5,
Line 1, after "An" delete -- air milled --.

Column 6,
Line 3, delete claim 16.
Line 3, insert -- 16. The method of claim 14, where the lamellar graphite particles are natural flake graphite thermally purified to 99.9% LOI; the graphite intercalation compound comprises an acid; and the graphite intercalation compound is expanded by heat. --.

Signed and Sealed this

Twentieth Day of December, 2005

JON W. DUDAS
*Director of the United States Patent and Trademark Office*

UNITED STATES PATENT AND TRADEMARK OFFICE
CERTIFICATE OF CORRECTION

PATENT NO.       : 6,287,694 B1						Page 1 of 1
APPLICATION NO.  : 09/253957
DATED            : September 11, 2001
INVENTOR(S)      : Peter L. Zaleski et al.

It is certified that error appears in the above-identified patent and that said Letters Patent is hereby corrected as shown below:

This certificate supersedes Certificates of Correction issued June 25, 2002 and December 20, 2005. The certificates is to be vacated since errors to be corrected were denied by the examiner of record for patent. No Certificate of Correction should have been issued on June 25, 2002 and December 20, 2005.

Signed and Sealed this

Twenty-seventh Day of November, 2007

JON W. DUDAS
*Director of the United States Patent and Trademark Office*